United States Patent [19]

Isobe et al.

[11] Patent Number: 5,340,869
[45] Date of Patent: Aug. 23, 1994

[54] COLORABLE BINDER COMPOSITION

[75] Inventors: Masao Isobe; Yoshio Aizawa, both of Yokohama; Kenichi Kogo; Chuzo Yoshida, both of Tokyo, all of Japan

[73] Assignee: Nippon Oil Company, Ltd., Tokyo, Japan

[21] Appl. No.: 51,349

[22] Filed: Apr. 23, 1993

[30] Foreign Application Priority Data

Apr. 28, 1992 [JP] Japan .................. 4-134361

[51] Int. Cl.⁵ .................. C08K 5/01; C08L 53/02; C08L 31/04; C08L 33/08
[52] U.S. Cl. .................. 524/484; 524/487; 524/505; 524/524; 524/525
[58] Field of Search .............. 524/68, 487, 474, 484, 524/485, 486, 505, 69, 524, 525

[56] References Cited

U.S. PATENT DOCUMENTS

| | | | |
|---|---|---|---|
| 3,297,625 | 1/1967 | Regenstein et al. | 524/474 |
| 3,849,355 | 11/1974 | Yamaguchi et al. | 524/69 |
| 4,511,689 | 4/1985 | Aldred | 524/69 |
| 4,613,632 | 9/1986 | Aliani et al. | 524/474 |
| 4,629,754 | 12/1986 | Syrier et al. | 524/68 |

FOREIGN PATENT DOCUMENTS

| | | | |
|---|---|---|---|
| 50-19836 | 3/1975 | Japan . | |
| 51-60229 | 5/1976 | Japan . | |
| 0038549 | 3/1977 | Japan | 524/69 |
| 58-183759 | 10/1983 | Japan . | |
| 0016580 | 10/1992 | PCT Int'l Appl. | 524/474 |
| 1096268 | 6/1984 | U.S.S.R. | 524/68 |
| 1226234 | 3/1971 | United Kingdom . | |

*Primary Examiner*—Peter Szekely
*Attorney, Agent, or Firm*—Armstrong, Westerman, Hattori, McLeland & Naughton

[57] ABSTRACT

A binder composition comprising a petroleum resin, an aromatic heavy mineral oil, a thermoplastic elastomer, an ethylene copolymer and a waxy substance has a high viscosity at 60° C. and a low viscosity at high temperatures, and can provide a mixture together with aggregate having remarkably high compressive strength.

10 Claims, No Drawings

COLORABLE BINDER COMPOSITION

BACKGROUND OF THE INVENTION

This invention relates to a binder composition excellent in durability and particularly useful for producing a material for paving roads colored with a red color, a blue color, or the like in sidewalks, parks, driveways, and the like.

As colored pavements, there are asphalt mixture pavement using colored aggregate, colored concrete pavement, block pavement, colored binder pavement using a petroleum resin, epoxy resin, or the like, and pavement coated with a resin coating composition. In the colored binder pavement using a petroleum resin, a composition obtained by mixing a petroleum resin with an aromatic mineral oil and a styrene-conjugated diene type block copolymer has been used as a binder composition (British Patent No. 1,226,234, Japanese Patent Kokai (Laid open) Nos. 50-19836, 51-60229 and 58-183759. Since such a binder composition is colored slightly, the pavement can be colored anyhow by adding one or more colored aggregate, pigments and dyes thereto. Further, when aggregate for paving roads is added to such a binder composition, there can be obtained a mixture as tough as conventional asphalt mixtures.

However, paving mixtures using known binder compositions for color pavement have a defect in that compressive strength, i.e., dynamic stability evaluated by the wheel tracking test, is low. Thus, such paving mixtures are not suitable for applying to driveways, particularly under the heavy traffic loads. Therefore, there have been desired binder compositions for color paving great in compressive strength, good in durability and applicable to roads with heavy traffic.

SUMMARY OF THE INVENTION

The object of this invention is to provide a binder composition for color paving and the like overcoming the problems mentioned above and being able to maintain good low temperature properties and to increase the compression strength when mixed with aggregate, while maintaining a low viscosity at high temperatures.

The present invention provides a binder composition comprising a petroleum resin, an aromatic heavy mineral oil, a thermoplastic elastomer, an ethylene copolymer, and a waxy substance.

DESCRIPTION OF THE PREFERRED EMBODIMENTS

As the petroleum resin, there can be used aromatic petroleum resins having a molecular weight of preferably 500 to 3000 obtained by polymerizing a petroleum fraction and/or coal fraction having a boiling point of 140° C. to 240° C., e.g. aromatic vinyl compounds having 9 carbon atoms, as at it is, or together with a phenol such as phenol, catechol, resorcinol, hydroquinone, etc. using a Friedel-Crafts catalyst; coumarone-indene resins; homopolymers of a five-membered ring compound having conjugated double bonds and represented by the formula:

wherein R is an alkyl group having 1 to 3 carbon atoms; and n is zero or an integer of 1 to 6, and/or a Dieles-Alder adduct thereof; cyclopentadiene resins obtained by copolymerizing 100 parts by weight of the five-membered ring compound and/or a Dieles-Alder adduct thereof mentioned above with 2 to 200 parts by weight of at least one member selected from monohydric phenols, polyhydric phenols and alkyl-substituted phenols thereof; terpene resins preferably having a molecular weight of 500 to 3000 obtained from turpentine oil; aliphatic resins obtained by hydrogenating these petroleum resins; etc.

Among them, preferable examples are aromatic petroleum resins having a softening point of 80° to 180° C. and a flash point of 240° C. or higher. Further, for obtaining the aromatic petroleum resins, it is usual to use as an aromatic petroleum fraction, cracked petroleum fraction having a boiling point of 140° to 240° C. obtained by thermal decomposition such as steam cracking of petroleum fractions such as naphtha, kerosene, gas oil and the like, or coal carbonization oil having the same boiling point mentioned above, and to subject to decomposition of the catalyst with an alkali after polymerization, followed by purification by removing unreacted oil and low polymerized product by distillation.

As the aromatic heavy mineral oil, there can be used a mineral oil having a flash point of 240° C. or higher, preferably 260° C. or higher, a kinetic viscosity of 500 cSt (40° C.) or higher, preferably 1,000 cSt (40° C.) or higher and an aromatic content of 40% by weight or more, preferably 50% by weight or more. The aromatic content is measured according to the test method "JPI-5S-22-83" defined in The Japan Petroleum Institute Standards.

Preferable examples of the aromatic heavy mineral oil are extracts of bright stock obtained from the solvent extraction process during petroleum refining. As the solvent used in the solvent extraction process, there can be used phenol, N-methylpyrrolidone, liquid sulfur dioxide, furfural, etc. Among them, the use of furfural is preferable.

As the thermoplastic elastomer, there can be used block copolymers of styrene and conjugated diene and hydrogenated conjugated diene block, and represented by the formula:

$$A-B-A \text{ or } A-B-A-B$$

wherein A is styrene; and B is butadiene or isoprene or hydrogenated polymer block of butadiene or isoprene. Preferable examples of the thermoplastic elastomer are styrene-butadiene block copolymers having polystyrene blocks at both ends and polybutadiene block in the middle, the proportion of polystyrene being 15 to 45% by weight, and average molecular weight being 5,000 to 200,000.

These thermoplastic elastomers have a smaller molecular weight than usual rubber and are thermoplastic and good in compatibility with the petroleum resin and the aromatic heavy mineral oil. These thermoplastic elastomers can be used singly or as a mixture of thermoplastic elastomers having different average molecular weights or having different styrene contents.

As the ethylene copolymer, there can be used ethylene-ethyl acrylate copolymer (EEA) and/or ethylene-vinyl acetate copolymer (EVA).

EEA is a high-polymeric random copolymer of ethylene and ethyl acrylate, wherein the proportion of ethyl acrylate is preferably 10 to 40% by weight. When the proportion of ethyl acrylate is too small, the compatibility with binder becomes unpreferably poor. It is preferable to use EEA having a melt flow rate (JIS K6760) of about 2 to 30 g/10 min.

EVA is a high-polymeric random copolymer of ethylene and vinyl acetate, wherein the proportion of vinyl acetate is preferably 10 to 40% by weight. When the proportion of vinyl acetate is too small, the compatibility with binder becomes unpreferably poor. It is preferable to use EVA having a melt flow rate (JIS K6760) of about 15 to 400 g/10 min.

EEA or EVA can be used singly, or a mixture of EEA and EVA can be used. By using the ethylene copolymer, the binder composition is provided with flexibility in a broad temperature range, and improved in crack resistance and impact resistance.

As the waxy substance, there can preferably be used low-molecular-weight polyethylene and/or low-molecular-weight polypropylene. The low-molecular-weight polyethylene or polypropylene can be produced by a thermal decomposition of high-molecular-weight polyethylene or polypropylene to give a low-molecular-weight polymer, or by direct polymerization of ethylene or propylene, or side production thereof. The low-molecular-weight polyethylene or polypropylene preferably has a number average molecular weight of 500 to 15,000, more preferably 3,000 to 6,000, a softening point of 90° to 160° C., more preferably 120° C. to 150° C., and a viscosity of 500 cp or less at 160° C.

When the average molecular weight is too small or when the softening point is too low, an effect for increasing the viscosity at 60° C. of the binder composition becomes poor. Further, when such a binder composition is used in a binder mixture, the increase of compressive strength becomes too small to make the improvement undesirably low. On the other hand, when the average molecular weight is too large, or when the softening point is too high, the compatibility with binder composition becomes poor and elongation of the binder composition at low temperatures undesirably worsens. When the viscosity at 160° C. is too high, the viscosity of the binder composition at high temperatures becomes undesirably high.

The low-molecular-weight polyethylene and the low-molecular-weight polypropylene can be used singly or as a mixture thereof.

The binder composition of the present invention preferably contains the petroleum resin in an amount of 20 to 50% by weight, more preferably 25 to 40% by weight, the aromatic heavy mineral oil in an amount of 77 to 34% by weight, more preferably 68 to 50% by weight, the thermoplastic elastomer in an amount of 2 to 10% by weight, more preferably 3 to 8% by weight, the ethylene copolymer in an amount of 2 to 8% by weight, more preferably 3 to 7% by weight, and the waxy substance in an amount of 1 to 8% by weight, more preferably 2 to 7% by weight, a total being 100% by weight.

The binder composition of the present invention may further contain one or more conventional additives such as anti-stripping agents of amine compounds and the like, calcium hydroxide for preventing stripping, etc.

The binder composition of the present invention can preferably be used in color binder mixtures for paving roads together with aggregate for pavement and various pigments such as chrome yellow pigment, ultramarine blue pigment, etc. The binder composition is usually contained in the binder mixture in an amount of usually 3 to 15% by weight, preferably 4 to 8% by weight.

The binder composition of the present invention can further be used for roofing, sealing, coating, flood protection construction, etc.

The present invention is illustrated by way of the following Examples, in which all percents are by weight unless otherwise specified.

EXAMPLES 1 TO 11, COMPARATIVE EXAMPLES 1 TO 6

Binder compositions were prepared by mixing a petroleum resin, an aromatic heavy mineral oil, a thermoplastic elastomer, an ethylene copolymer and a waxy substance as mentioned below. That is, suitable amounts of an aromatic heavy mineral oil, a thermoplastic elastomer and an ethylene copolymer were kneaded at 170° to 190° C. to dissolve the thermoplastic elastomer and ethylene copolymer completely in the aromatic heavy oil. Then, a remaining amount of the aromatic heavy mineral oil was added to the resulting mixture, followed by addition of a petroleum resin and a waxy substance and stirring at 160° to 180° C. for about 1 hour to yield each binder composition.

The raw materials used were as follows.

| [Petroleum resin] | | |
|---|---|---|
| Petroleum resin | A | B |
| Kind | $C_9$-aromatic | $C_9$-aromatic |
| Manufacturer | Nippon Petrochemicals Co., Ltd. | |
| Trade name | Nisseki Neopolymer 170S | Nisseki Neopolymer 130 |
| Softening point (JIS 2207) | 160° C. | 130° C. |
| Average mol. wt. (GPC method) | 2,700 | 1,800 |
| [Aromatic heavy mineral oil] | | |
| Kind | Furfural extract of bright stock | |
| Viscosity (at 40° C.) (JIS K2283) | 2,733 cSt | |
| Flash point (JIS K2265) | 324° C. | |
| Aromatic content (JPI-5S-22-83) | 63 wt % | |
| Density (15° C.) (JIS K2249) | 0.980 g/cm$^3$ | |
| [Thermoplastic elastomer] | | |
| Thermoplastic elastomer | A | B |
| Kind of elastomer | Styrene-butadiene-styrene block copolymer | |
| Manufacturer | Asahi Chemical Industry Co., Ltd. | |
| Trade name | Tafuplen 315 | Asaplen 430 |
| Styrene content | 20 wt % | 30 wt % |
| Melt index (ASTM D1238) | 15 g/10 min | 1 g/10 min or less |
| Hardness (JIS K6301) | 62 HS | 75 HS |
| Elongation (JIS K6301) | 880% | 850% |
| Specific gravity (ASTM D297) | 0.93 | 0.94 |

| [Ethylene copolymer] | | | |
|---|---|---|---|
| Ethylene copolymer | A | B | C |
| Kind | EEA | EEA | EVA |
| Manufacturer | Nippon Petrochemicals Co., Ltd. | | Mitsui Petrochemical Industries, Ltd. |
| Trade name | Nisseki Rexlon A 4250 | Nisseki Rexlon A 6170 | Evaflex 420 |
| Ethyl acrylate or vinyl acetate content | 25 wt % | 17 wt % | 19 wt % |
| Melt flow rate | 5 g/ | 20 g/ | 150 g/ |

| | | | | |
|---|---|---|---|---|
| (JIS K6760) | 10 min | 10 min | 10 min |
| Softening point (JIS K6760) | 42° C. | 60° C. | 100° C. |

[Low-molecular-weight Polypropylene]

| | | |
|---|---|---|
| Low-mol-wt PE | A | B |
| Manufacturer | Sanyo Chemical Industries, Ltd. | |
| Trade name | Viscol 660-P | Viscol 550-P |
| Softening point (JIS K2531) | 145° C. | 150° C. |
| Penetration (25° C., 5 g, 5 s) (JIS K2530) | 1.5 | 1 or less |
| Density (20° C.) (JIS K6760) | 0.89 g/cm³ | 0.89 g/cm³ |
| Viscosity (160° C.) (BL type viscometer) | 70 cP | 200 cP |
| number average molecular weight (vapor pressure osmometric method) | 3,000 | 4,000 |

[Low-molecular-weight Polyethylene]

| | |
|---|---|
| Low-mol-wt PP | A |
| Manufacturer | Mitsui Petrochemical Industries, Ltd. |
| Trade Name | Mitsui Hi-wax 220 P |
| Softening point (JIS K2531) | 113° C. |
| Penetration (25° C., 5 g, 5 s) (JIS K2530) | 13 |
| Viscosity (160° C.) (BF type viscometer) | 50 cP |
| Average molecular weight (Viscosity method) | 2,000 |

Properties of the binder compositions were measured and listed in Tables 1, 2 and 3.

The binder compositions cited in Tables 1 to 3 are selected so as to make the penetration 40/60. It is possible to prepare binder compositions having the penetration of 60/80, 80/100, and the like by changing the proportions of individual components. In Table 1, the petroleum resin A is used, and in Table 2, the petroleum resin B is used.

TABLE 1

| Example No. | | 1 | 2 | 3 | 4 | 5 | 6 |
|---|---|---|---|---|---|---|---|
| Composition | | | | | | | |
| Petroleum resin A | (wt %) | 27 | 29 | 30 | 28 | 27 | 27 |
| Aromatic heavy mineral | (wt %) | 57 | 58 | 56 | 58 | 58 | 59 |
| Thermoplastic elastomer A | (wt %) | 8 | 8 | 8 | 8 | 7 | 8 |
| Ethylene copolymer A | (wt %) | 3 | — | — | 3 | — | — |
| Ethylene copolymer B | (wt %) | — | 3 | — | — | 5 | — |
| Ethylene copolymer C | (wt %) | — | — | 3 | — | — | 3 |
| Low-mol-wt PP A | (wt %) | 5 | 2 | 3 | — | — | — |
| Low-mol-wt PE A | (wt %) | — | — | — | 3 | 3 | 3 |
| Properties | | | | | | | |
| Penetration, 25° C., 0.1 mm | | 45 | 46 | 41 | 44 | 42 | 41 |
| Softening point, R & B | (°C.) | 73.0 | 57.5 | 60.5 | 75.0 | 67.5 | 74.5 |
| Ductility, 15° C. | (cm) | 36 | 31 | 37 | 37 | 44 | 33 |
| Viscosity (60° C.) | (p) | 19,700 | 15,000 | 10,900 | 58,000 | 22,200 | 19,500 |
| Viscosity (180° C.) | (cSt) | 355 | 348 | 305 | 359 | 320 | 304 |
| Toughness | (kgf · cm) | 202 | 254 | 273 | 237 | 218 | 235 |
| Tenacity | (kgf · cm) | 121 | 186 | 182 | 166 | 141 | 176 |

Note)
Viscosity (60° C.) was measured according to the Japanese Asphalt Society Standards.
Toughness and tenacity were measured according to the Japanese Asphalt Society Standards.
Other properties were measured according to JIS K2207.

TABLE 2

| Example No. | | 7 | 8 | 9 | 10 | 11 |
|---|---|---|---|---|---|---|
| Composition | | | | | | |
| Petroleum resin B | (wt %) | 33 | 33 | 31 | 35 | 32 |
| Aromatic heavy mineral oil | (wt %) | 51 | 51 | 53 | 52 | 52 |
| Thermoplastic elastomer A | (wt %) | 8 | 8 | 8 | 8 | — |
| Thermoplastic elastomer B | (wt %) | — | — | — | — | 8 |
| Ethylene copolymer A | (wt %) | 3 | 3 | 3 | — | 3 |
| Ethylene copolymer C | (wt %) | — | — | — | 3 | — |
| Low-mol-wt PP A | (wt %) | 5 | — | — | — | 5 |
| Low-mol-wt PP B | (wt %) | — | 5 | — | — | — |
| Low-mol-wt PE A | (wt %) | — | — | 5 | 2 | — |
| Properties | | | | | | |
| Penetration, 25° C., 0.1 mm | | 43 | 55 | 41 | 46 | 42 |
| Softening point, R & B | (°C.) | 69.5 | 56.0 | 91.0 | 60.0 | 73.5 |
| Ductility, 15° C. | (cm) | 48 | 51 | 48 | 56 | 52 |
| Viscosity (60° C.) | (p) | 16,500 | 20,900 | 130,000 | 12,700 | 18,900 |
| Viscosity (180° C.) | (cSt) | 362 | 419 | 343 | 336 | 345 |
| Toughness | (kgf · cm) | 309 | 272 | 231 | 288 | 276 |
| Tenacity | (kgf · cm) | 232 | 212 | 170 | 229 | 212 |

TABLE 3

| Comparative Example No. | | 1 | 2 | 3 | 4 | 5 | 6 |
|---|---|---|---|---|---|---|---|
| Composition | | | | | | | |
| Petroleum resin A | (wt %) | 30 | 29 | 30 | 29 | 30 | — |
| Petroleum resin B | (wt %) | — | — | — | — | — | 38 |
| Aromatic heavy mineral | (wt %) | 58 | 58 | 57 | 59 | 58 | 51 |

TABLE 3-continued

| Comparative Example No. | | 1 | 2 | 3 | 4 | 5 | 6 |
|---|---|---|---|---|---|---|---|
| Thermoplastic elastomer A | (wt %) | 12 | 8 | 10 | 8 | 8 | 6 |
| Ethylene copolymer A | (wt %) | — | 5 | — | — | — | 5 |
| Ethylene copolymer C | (wt %) | — | — | 3 | — | — | — |
| Low-mol-wt PP A | (wt %) | — | — | — | 4 | — | — |
| Low-mol-wt PE A | (wt %) | — | — | — | — | 4 | — |
| Properties | | | | | | | |
| Penetration, 25° C., 0.1 mm | | 51 | 48 | 43 | 40 | 41 | 40 |
| Softening point, R & B | (°C.) | 55.5 | 56.0 | 58.0 | 78.5 | 77.0 | 57.5 |
| Ductility, 15° C. | (cm) | 73 | 72 | 60 | 50 | 42 | 36 |
| Viscosity (60° C.) | (p) | 10,200 | 10,480 | 13,200 | 20,300 | 23,400 | 12,600 |
| Viscosity (180° C.) | (cSt) | 530 | 616 | 493 | 172 | 146 | 457 |
| Toughness | (kgf · cm) | 289 | 322 | 301 | 275 | 302 | 312 |
| Tenacity | (kgf · cm) | 202 | 266 | 254 | 232 | 246 | 273 |

Note)
PP: polypropylene
PE: polyethylene

EXAMPLES 12 TO 22, COMPARATIVE EXAMPLES 7 TO 12

Dense grade binder mixtures were prepared under the conditions shown in Table 4.

TABLE 4

| Kind of binder mixture | | Dense grade mixture |
|---|---|---|
| Mixing temperature | °C. | 160 to 170 |
| Compacting temperature | °C. | 135 to 145 |
| Binder amount | in wt % | 5.9* |
| Aggregates | | |
| Crushed stone #6, | wt % | 44 |
| Crushed stone #7, | wt % | 15 |
| Coarse sand | wt % | 15 |
| Fine sand | wt % | 20 |
| Filler | wt % | 6 |

*in wt % on the basis of the total amount of binder mixture (binder plus aggregates)

The compressive strength of the resulting binder mixtures was evaluated by the wheel tracking test described on page 539 of "Handbook of Pavement Test Methods" published by Maruzen Co., Ltd. in 1988. The dynamic stability (DS) was measured at the test temperature of 60° C., contact pressure of 6.5 kg/cm² and repetition of 2 times. The results are shown in Table 5.

TABLE 5

| Example No. | Binder composition | Dynamic stability (times/mm) | Void percent (%) |
|---|---|---|---|
| Example | Example | | |
| 12 | 1 | 1,970 | 4.9 |
| 13 | 2 | 1,510 | 5.0 |
| 14 | 3 | 1,650 | 5.0 |
| 15 | 4 | 1,720 | 4.8 |
| 16 | 5 | 2,520 | 5.0 |
| 17 | 6 | 1,860 | 4.7 |
| 18 | 7 | 1,970 | 4.5 |
| 19 | 8 | 3,150 | 4.8 |
| 20 | 9 | 1,900 | 5.0 |
| 21 | 10 | 2,030 | 5.0 |
| 22 | 11 | 2,860 | 5.1 |
| Comparative Example | Comparative Example | | |
| 7 | 1 | 2,500 | 5.2 |
| 8 | 2 | 1,210 | 5.4 |
| 9 | 3 | 1,210 | 5.1 |
| 10 | 4 | 460 | 4.6 |
| 11 | 5 | 440 | 4.7 |
| 12 | 6 | 1,380 | 5.0 |

The binder compositions of Examples 1 to 6 shown in Table 1 have excellent properties, e.g. the ductility (15° C.) of 30 cm or more, the viscosity (60° C.) of 10,000 P or more, the viscosity (180° C.) of 360 cSt or less, and the toughness of 200 kgf·cm or more. These properties satisfy the requirements of the standards of modified asphalt II type for heavy traffic roads prescribed by Japan Road Association (see Table 6) and are equal to the modified asphalt II type as the binder.

TABLE 6

| Properties | | Modified asphalt II type |
|---|---|---|
| Penetration (25° C.) | 1/10 mm | 40 or more |
| Softening point | (°C.) | 56.0–70.0 |
| Ductility (7° C.) | (cm) | — |
| Ductility (15° C.) | (cm) | 30 or more |
| Flash point | (°C.) | 280 or more |
| Weight charge after thin-film over test | (%) | 0.6 or less |
| Retained penetration after thin-film over test | (%) | 65 or more |
| Toughness | (kgf · cm) | 80 or more |
| Tenacity | (kgf · cm) | 40 or more |

The binder compositions of Examples 7 to 11 shown in Table 2 also have excellent properties, e.g. the ductility (15° C.) of 45 cm or more, the viscosity (60° C.) of 12,000 P or more, the viscosity (180° C.) of 420 cSt or less, and the toughness of 230 kgf·cm or more.

In contrast, the composition of Comparative Example 1 has a larger amount of thermoplastic elastomer. When the viscosity (60° C.) is made 10,000 P or more only by the addition of thermoplastic elastomer, the viscosity (180° C.) becomes as high as 530 cSt undesirably. In Comparative Examples 2, 3 and 6, ethylene copolymers are added to the thermoplastic elastomer in the compositions. The viscosity (180° C.) is undesirably as high as 450 cSt or more, resulting in making workability of paving construction poor. In Comparative Examples 4 and 5, thermoplastic elastomers and waxy substances are added to the compositions, wherein the viscosity (180° C.) is as good as 200 cSt or less.

The dense grade mixtures of Examples 11 and 12 show excellent resistance to anti-rutting properties showing 1,500 times/min or more of the dynamic stability in the wheel tracking test. In contrast, in Comparative Example 7, the dynamic stability is about 2,500 times/mm or more and good in anti-rutting properties, but the viscosity (180° C.) is undesirably high. In Comparative Examples 8, 9 and 12, the dynamic stability of 1,000 times/mm or more is not a sufficient value. In Comparative Examples 10 and 11, the dynamic stability is 500 times/mm or less and the resistance to anti-rutting properties is very poor.

As mentioned above, the binder composition of the present invention has high viscosity (60° C.) but low viscosity at high temperatures. Further a mixture of the binder composition and aggregate has remarkably high compressive strength.

What is claimed is:

1. A colorable binder composition which comprises a petroleum resin, an aromatic heavy mineral oil, a thermoplastic elastomer, an ethylene copolymer, and at least one member selected from the group consisting of a low-molecular-weight polyethylene and low-molecular-weight polypropylene, the member having a number average molecular weight of 500 to 15,000.

2. A colorable binder composition according to claim 1, wherein the petroleum resin is contained in an amount of 20 to 50% by weight, the aromatic heavy mineral oil is contained in an amount of 34 to 77% by weight, the thermoplastic elastomer is contained in an amount of 2 to 10% by weight, the ethylene copolymer is contained in an amount of 2 to 8% by weight, and the member is contained in an amount of 1to 8% by weight.

3. A colorable binder composition according to claim 1, wherein the aromatic heavy mineral oil is furfural extract of a bright stock.

4. A colorable binder composition according to claim 2, wherein the aromatic heavy mineral oil is a furfural extract of a bright stock.

5. A colorable binder composition according to claim 1, wherein the thermoplastic elastomer is at least one member selected from the group consisting of styrene-butadiene-styrene block copolymers, styrene-isoprene-styrene-block copolymers, hydrogenated butadiene block-containing block copolymers and hydrogenated isoprene block-containing block copolymers.

6. A colorable binder composition according to claim 2, wherein the thermoplastic elastomer is at least one member selected from the group consisting of styrene-butadiene-styrene block copolymers, styrene-isoprene-styrene-block copolymers, hydrogenated butadiene block-containing block copolymers and hydrogenated isoprene block-containing block copolymers.

7. A colorable binder composition according to claim 1, wherein the ethylene copolymer si at least one copolymer selected from the group consisting of ethylene-ethyl acrylate copolymers and ethylene-vinyl acetate copolymers.

8. A colorable binder composition according to claim 2, wherein the ethylene copolymer si at least one copolymer selected from the group consisting of ethylene-ethyl acrylate copolymers and ethylene-vinyl acetate copolymers.

9. A colorable binder composition according to claim 1, wherein the member has a softening point of 90° C. and a viscosity at 160° C. of 500 cp or less.

10. A colorable binder composition according to claim 2, wherein the member has a softening point of 90° C. and a viscosity at 160° C. of 500 cp or less.

* * * * *